US010770726B2

(12) United States Patent
Im et al.

(10) Patent No.: US 10,770,726 B2
(45) Date of Patent: Sep. 8, 2020

(54) METHOD FOR MANUFACTURING ELECTRODE, ELECTRODE MANUFACTURED BY SAME, ELECTRODE STRUCTURE INCLUDING ELECTRODE, FUEL CELL OR METAL-AIR SECONDARY BATTERY, BATTERY MODULE INCLUDING CELL OR BATTERY, AND COMPOSITION FOR MANUFACTURING ELECTRODE

(71) Applicant: LG CHEM, LTD., Seoul (KR)

(72) Inventors: Sanghyeok Im, Daejeon (KR); Changseok Ryoo, Daejeon (KR); Gyunjoong Kim, Daejeon (KR); Kwangwook Choi, Daejeon (KR); Jong Woo Kim, Daejeon (KR); Yeonhyuk Heo, Daejeon (KR); Tai Min Noh, Daejeon (KR)

(73) Assignee: LG CHEM, LTD., Seoul (KR)

( * ) Notice: Subject to any disclaimer, the term of this patent is extended or adjusted under 35 U.S.C. 154(b) by 189 days.

(21) Appl. No.: 15/543,385

(22) PCT Filed: Mar. 7, 2016

(86) PCT No.: PCT/KR2016/002249
§ 371 (c)(1),
(2) Date: Jul. 13, 2017

(87) PCT Pub. No.: WO2016/144067
PCT Pub. Date: Sep. 15, 2016

(65) Prior Publication Data

US 2018/0006301 A1 Jan. 4, 2018

(30) Foreign Application Priority Data

Mar. 6, 2015 (KR) ........................ 10-2015-0031557

(51) Int. Cl.
*H01M 4/02* (2006.01)
*H01M 4/52* (2010.01)
(Continued)

(52) U.S. Cl.
CPC ............... *H01M 4/52* (2013.01); *H01M 4/50* (2013.01); *H01M 4/86* (2013.01); *H01M 4/8605* (2013.01);
(Continued)

(58) Field of Classification Search
CPC ...................................................... H01M 8/04
See application file for complete search history.

(56) References Cited

U.S. PATENT DOCUMENTS 5,453,330 A 9/1995 Kawasaki et al.
2003/0027033 A1* 2/2003 Seabaugh ............ C04B 35/016 429/489
(Continued)

FOREIGN PATENT DOCUMENTS

CN 102047477 A 5/2011
CN 103840185 A 6/2014
(Continued)

OTHER PUBLICATIONS

International Search Report issued in PCT/KR2016/002249 (PCT/ISA/210), dated Jun. 21, 2016.

*Primary Examiner* — Jacob B Marks
(74) *Attorney, Agent, or Firm* — Birch, Stewart, Kolasch & Birch, LLP

(57) ABSTRACT

The present specification relates to a method for manufacturing an electrode, an electrode manufactured by the same, an electrode structure including the electrode, a fuel cell or a metal-air secondary battery including the electrode, a
(Continued)

Air In
$O_2$
e
Cathode
Load
$O^{2-}$
Electrolyte
Anode
e
$H_2$
$H_2O$
Fuel In battery module including the fuel cell or the metal-air secondary battery, and a composition for manufacturing an electrode.

18 Claims, 3 Drawing Sheets

(51) Int. Cl.

| | |
|---|---|
| ***H01M 12/08*** | (2006.01) |
| ***H01M 4/90*** | (2006.01) |
| ***H01M 4/88*** | (2006.01) |
| ***H01M 4/86*** | (2006.01) |
| ***H01M 8/10*** | (2016.01) |
| ***H01M 8/02*** | (2016.01) |
| ***H01M 4/50*** | (2010.01) |
| ***H01M 12/06*** | (2006.01) |

(52) U.S. Cl.
CPC ............. *H01M 4/88* (2013.01); *H01M 4/881* (2013.01); *H01M 4/8882* (2013.01); *H01M 4/9016* (2013.01); *H01M 8/02* (2013.01); *H01M 8/10* (2013.01); *H01M 12/06* (2013.01); *H01M 12/08* (2013.01); *Y02E 60/128* (2013.01)

(56) References Cited

U.S. PATENT DOCUMENTS

2006/0057455 A1 3/2006 Guntow et al.
2008/0176113 A1* 7/2008 Wu .................... H01M 4/8621 429/489
2009/0297923 A1 12/2009 Backhaus-Ricoult et al.
2012/0164552 A1* 6/2012 Kobayashi ............ H01M 4/861 429/480
2013/0095408 A1 4/2013 Jung et al.
2014/0106259 A1 4/2014 Kwak et al.
2014/0162149 A1* 6/2014 Niimi .................. H01M 4/8885 429/405
2014/0287342 A1 9/2014 Jabbar et al.
2014/0302420 A1* 10/2014 Wachsman .......... H01M 4/9033 429/489
2015/0050579 A1* 2/2015 Ran ..................... H01M 8/1233 429/486
2015/0111114 A1* 4/2015 Nakayama .......... H01M 4/8605 429/405
2015/0255820 A1* 9/2015 Shimomura ........ H01M 4/9025 429/482
2016/0164114 A1 6/2016 Kim et al.

FOREIGN PATENT DOCUMENTS

| | | | |
|---|---|---|---|
| JP | 5-190180 | A | 7/1993 |
| KR | 10-2003-0045324 | A | 6/2003 |
| KR | 10-2012-0002645 | A | 1/2012 |
| KR | 10-2013-0040640 | A | 4/2013 |
| KR | 10-1334903 | B1 | 11/2013 |
| KR | 10-2014-0048738 | A | 4/2014 |
| KR | 10-2014-0096310 | A | 8/2014 |
| KR | 10-2015-0016118 | A | 2/2015 |

* cited by examiner

[Figure 1]
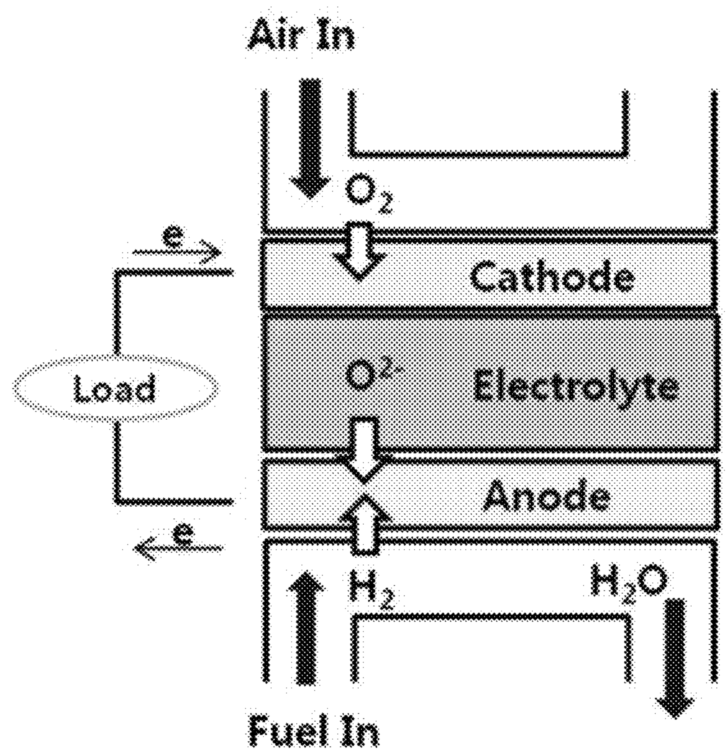

[Figure 2]
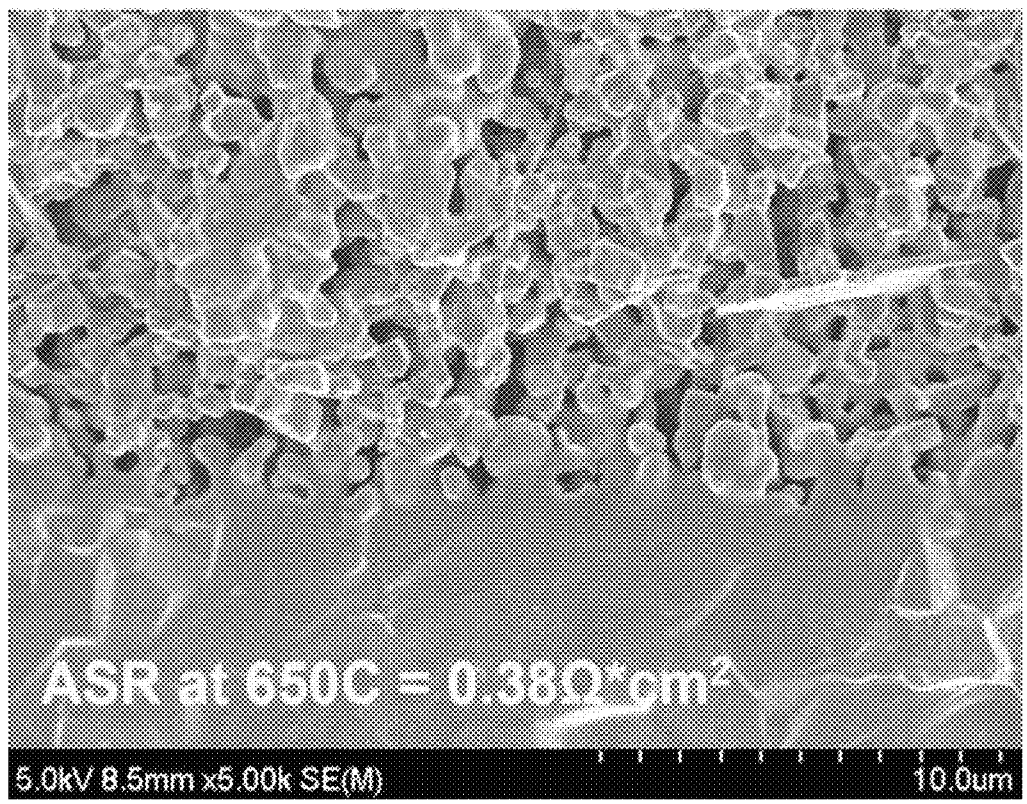

[Figure 3]
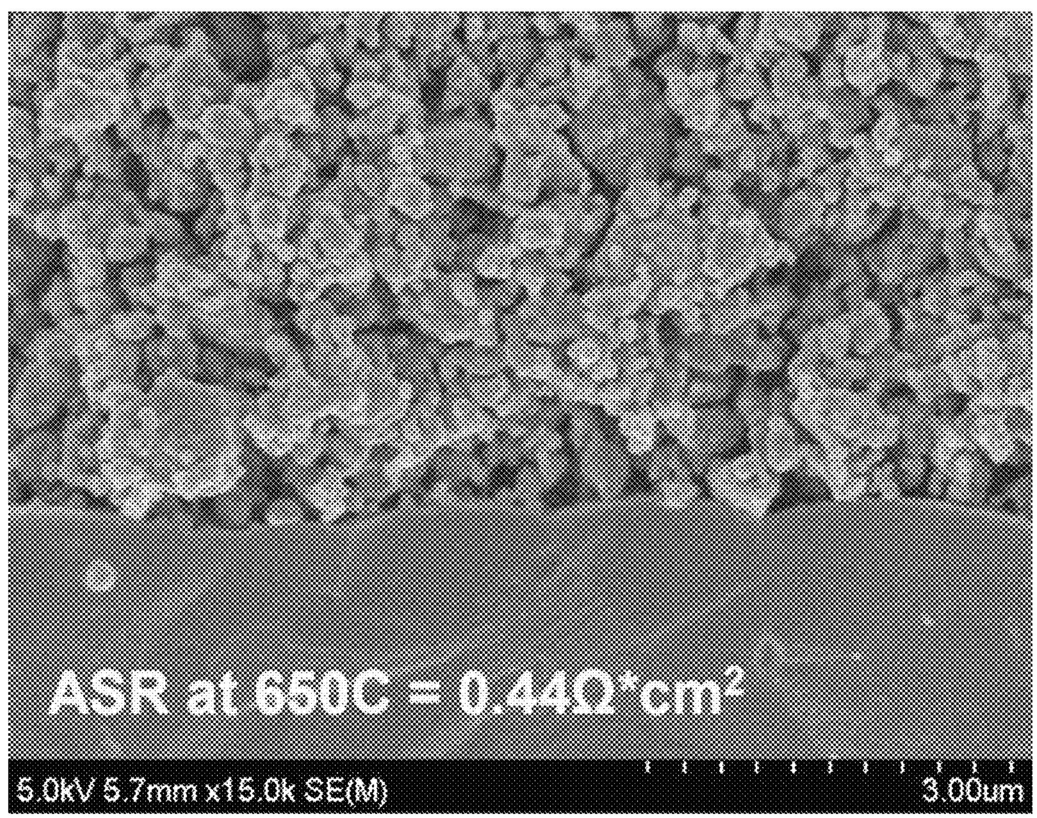

METHOD FOR MANUFACTURING ELECTRODE, ELECTRODE MANUFACTURED BY SAME, ELECTRODE STRUCTURE INCLUDING ELECTRODE, FUEL CELL OR METAL-AIR SECONDARY BATTERY, BATTERY MODULE INCLUDING CELL OR BATTERY, AND COMPOSITION FOR MANUFACTURING ELECTRODE

TECHNICAL FIELD

The present invention claims priority to and the benefit of Korean Patent Application No. 10-2015-0031557 filed in the Korean Intellectual Property Office on Mar. 6, 2015, the entire contents of which are incorporated herein by reference.

The present specification relates to a method for manufacturing an electrode, an electrode manufactured by the same, an electrode structure including the electrode, a fuel cell or a metal-air secondary battery including the electrode, a battery module including the fuel cell or the metal-air secondary battery, and a composition for manufacturing an electrode.

BACKGROUND ART

Recently, with the expected exhaustion of the existing energy resources such as petroleum or coal, there is a growing interest in energy which may substitute for the existing energy resources. As one of these alternative energies, a fuel cell is receiving particular attention due to the advantages in that the fuel cell is highly efficient and does not discharge pollutants such as NOx and SOx, and the fuel used is abundant.

A fuel cell is a power generation system which converts chemical reaction energy of a fuel and an oxidizing agent into electric energy, and representatively, hydrogen and hydrocarbons such as methanol or butane are used as the fuel, and oxygen is used as the oxidizing agent.

Examples of the fuel cell include a polymer electrolyte membrane fuel cell (PEMFC), a direct-methanol fuel cell (DMFC), a phosphoric acid fuel cell (PAFC), an alkaline fuel cell (AFC), a molten carbonate fuel cell (MCFC), a solid oxide fuel cell (SOFC), and the like.

Meanwhile, there is also a need for studying a metal-air secondary battery in which a cathode of a metal secondary battery is manufactured as an air electrode by applying a principle of an air electrode of a fuel cell.

DETAILED DESCRIPTION OF THE INVENTION

Technical Problem

The present specification has been made in an effort to provide a method for manufacturing an electrode, an electrode manufactured by the same, an electrode structure including the electrode, a fuel cell or a metal-air secondary battery including the electrode, a battery module including the fuel cell or the metal-air secondary battery, and a composition for manufacturing an electrode.

Technical Solution

The present specification provides a method for manufacturing an electrode, the method including: forming a film by applying a composition including a precursor of a composite metal oxide onto a base material; and manufacturing an electrode by firing the film, in which in the firing, the film is sintered while the precursor of the composite metal oxide is synthesized into a composite metal oxide.

Further, the present specification provides an electrode manufactured by the manufacturing method.

In addition, the present specification provides a fuel cell including the electrode, a fuel electrode, and an electrolyte membrane provided between the electrode and the fuel electrode.

Furthermore, the present specification provides a metal-air secondary battery including the electrode, an anode, and a separation membrane provided between the electrode and the anode.

Further, the present specification provides a battery module including the fuel cell or the metal-air secondary battery as a unit cell.

In addition, the present specification provides an electrode structure including a solid electrolyte membrane and an electrode manufactured by the manufacturing method on the solid electrolyte membrane.

Furthermore, the present specification provides a composition for manufacturing an electrode, the composition including a precursor of a composite metal oxide.

Advantageous Effects

A method for manufacturing an electrode according to an exemplary embodiment of the present specification has an advantage in that costs are reduced because the process is simplified.

An electrode manufactured by the method for manufacturing an electrode according to an exemplary embodiment of the present specification has an advantage in that the electrode has excellent adhesive strength with an electrolyte membrane.

BRIEF DESCRIPTION OF DRAWINGS

FIG. 1 is a schematic view illustrating an electricity generation principle of a solid oxide fuel cell.

FIG. 2 is an SEM measurement image of a cross section of an Example in a thickness direction.

FIG. 3 is an SEM measurement image of a cross section of a Comparative Example in a thickness direction.

BEST MODE

Hereinafter, the present specification will be described in detail.

The present specification provides a method for manufacturing an electrode, the method including: forming a film by applying a composition including a precursor of a composite metal oxide onto a base material; and manufacturing an electrode by firing the film, in which in the firing, the film is sintered while the precursor of the composite metal oxide is synthesized into a composite metal oxide.

The method for manufacturing an electrode according to the present specification may include forming a film by applying a composition including a precursor of a composite metal oxide onto a base material.

The method of applying the composition onto the base material is not particularly limited, but a film may be formed by any one method among the methods of, for example, a screen printing, a brush printing, and laminating sheets through a tape casting.

The method for manufacturing an electrode according to the present specification may include manufacturing an electrode by firing the film.

In the firing, the firing temperature may be 900° C. or more and 1,200° C. or less.

In the firing, the firing time may be 1 hour or more and 5 hours or less.

In the firing, the film may be sintered while the precursor of the composite metal oxide is synthesized into a composite metal oxide.

In the firing, the precursor of the composite metal oxide in the composition for manufacturing an electrode may be synthesized into a composite metal oxide by receiving transferred heat, and being rotated, vibrated, or moved.

The precursor of the composite metal oxide is dispersed in a particle state in the composition for manufacturing an electrode and applied, and a composite metal oxide prepared by the precursor particles of the composite metal oxide may be synthesized in a particle state.

The precursor particles of the composite metal oxide may have an average diameter of 0.1 μm or more and 10 μm or less.

The composite metal oxide particles may have an average diameter of 0.1 μm or more and 2 μm or less.

The synthesized composite metal oxide particle may be a perovskite-type particle.

In the present specification, a perovskite-type oxide particle means a metal oxide particle with a cubic crystal structure, which exhibits not only properties of a non-conductor, a semi-conductor, and a conductor, but also a superconducting phenomenon.

The perovskite-type oxide particle may be represented by $ABO_3$, and in this case, the A position is a vertex of a cubic unit, the B position is a center of the cubic unit, and these atoms have a coordination number of 12 together with oxygen. In this case, cations of any one or two or more elements selected among rare earth elements, alkaline earth metal elements, and transition elements may be positioned at A and/or B.

For example, one or two or more cations having a large size and a low valence are positioned at A, cations having a small size and a generally high valence are positioned at B, and metal atoms at the A and B positions are coordinated by six oxygen ions in an octahedral coordination.

In the perovskite-type oxide particle, cations of any one or two or more elements selected among rare earth elements, alkaline earth metal elements, and transition elements may be positioned at A, and cations of transition metals may be positioned at B. For example, the transition metal of B may be a cation of a metal selected among Ti, Cr, Mn, Ni, Fe, Co, Cu, and Zr.

The composite metal oxide is not particularly limited as long as the composite metal oxide is a perovskite-type oxide particle, but for example, the synthesized composite metal oxide may include at least one of lanthanum strontium manganese oxide (LSM), lanthanum strontium cobalt ferrite (LSCF), lanthanum strontium gallium magnesium oxide (LSGM), lanthanum strontium nickel ferrite (LSNF), lanthanum calcium nickel ferrite (LCNF), lanthanum strontium copper oxide (LSC), gadolinium strontium cobalt oxide (GSC), lanthanum strontium ferrite (LSF), samarium strontium cobalt oxide (SSC), barium strontium cobalt ferrite (BSCF), bismuth strontium ferrite oxide (BiSF), and bismuth strontium cobalt oxide (BiSC).

The present specification may reduce steps of manufacturing an electrode, and costs by simultaneously synthesizing a composite metal oxide and sintering a film in the firing of the film.

A film formed by applying the composition for manufacturing an electrode includes a composition which manufactures an electrode in addition to the precursor of the composite metal oxide, and in the sintering of the film, a solvent in the composition which manufactures an electrode may be removed and the other compositions may be sintered along with the composite metal oxide synthesized from the precursor of the composite metal oxide.

The base material is not particularly limited, but may be glass or a plastic film.

When the base material is glass or a plastic film, the method may further include: forming a film by using a composition for manufacturing an electrode and then removing a solvent by drying the film; and laminating the film on an electrolyte membrane.

The base material may be an electrolyte membrane. In this case, an electrode may be formed on an electrolyte membrane by forming a film by using a composition for manufacturing an electrode, and then immediately firing the film, and as a result, it is possible to reduce the steps of manufacturing a battery and reduce costs.

The present specification provides an electrode manufactured by the manufacturing method.

The manufactured electrode may be a porous electrode, and the porous electrode may have a porosity of 10% or more and 60% or less.

The electrode may be an air electrode. The air electrode may be an air electrode of a fuel cell, or an air electrode of a metal-air secondary battery.

The present specification provides a fuel cell including the electrode, a fuel electrode, and an electrolyte membrane provided between the electrode and the fuel electrode.

The fuel cell may be a phosphoric acid fuel cell (PAFC), an alkaline fuel cell (AFC), a polymer electrolyte membrane fuel cell (PEMFC), a direct-methanol fuel cell (DMFC), a molten carbonate fuel cell (MCFC), and a solid oxide fuel cell (SOFC).

The electrode manufactured by the manufacturing method of the present specification may be an air electrode of a fuel cell.

The air electrode means an electrode in which the reduction reaction of an oxidizing agent such as oxygen or air occurs.

The fuel electrode is an electrode in which the oxidation reaction of fuel occurs, and may include a catalyst for the oxidation reaction of fuel.

As the catalyst, a typical material known in the art may be used, and in the case of a solid oxide fuel cell, the catalyst may be a perovskite-type oxide particle.

The fuel electrode may be an electrode manufactured by the manufacturing method of the present specification. The perovskite-type oxide of the fuel electrode may be the same as or different from a perovskite-type oxide of an air electrode.

The electrolyte membrane may be a solid electrolyte membrane or a polymer electrolyte membrane.

The electrolyte membrane is preferably a solid electrolyte membrane, and in this case, the fuel cell may be a solid oxide fuel cell (SOFC).

FIG. 2 schematically illustrates an electricity generation principle of a solid oxide fuel cell, and the fuel cell is composed of an electrolyte membrane (electrolyte) and a fuel electrode (anode) and an air electrode (cathode) formed on both surfaces of the electrolyte membrane. Referring to FIG. 2 illustrating the electricity generation principle of the fuel cell, oxygen ions are produced while air is electrochemically reduced at the air electrode, and the produced oxygen ions are transferred to the fuel electrode through the electrolyte membrane. Fuel such as hydrogen or a hydrocarbon such as methanol and butane is injected into the fuel electrode, and the fuel is bonded to oxygen ions to give out electrons while being electrochemically oxidized, thereby producing water. Electrons move to an external circuit by the reaction.

The present specification provides a metal-air secondary battery including the electrode, an anode, and a separation membrane provided between the electrode and the anode.

The electrode manufactured by the manufacturing method of the present specification may be an air electrode of a metal-air secondary battery.

The anode includes a metal capable of emitting electrons when a battery is discharged, and may include at least one of a metal, a composite metal, a metal oxide, and a composite metal oxide.

The type of metal-air secondary battery may be determined depending on the type of metal included in the anode, and for example, when the anode includes a lithium metal, the metal-air secondary battery may be a lithium-air secondary battery, and when the anode includes a zinc metal, the metal-air secondary battery may be a zinc-air secondary battery, and when the anode includes an aluminum metal, the metal-air secondary battery may be an aluminum-air secondary battery.

The form of the metal-air secondary battery is not limited, and may be, for example, a coin-type, a flat plate-type, a cylinder-type, a cone-type, a button-type, a sheet-type, or a laminate-type.

The present specification provides a battery module including the fuel cell as a unit cell.

The battery module may include: a stack which includes a unit cell including the fuel cell and a separator provided between the unit cells; a fuel supply part which supplies fuel to the stack; and an oxidizing agent supply part which supplies an oxidizing agent to the stack.

The present specification provides a battery module including the metal-air secondary battery as a unit cell.

The battery module may be formed by stacking the unit cells by inserting a bipolar plate between the metal-air secondary batteries.

The bipolar plate may be porous so as to be capable of supplying the air supplied from the outside to a cathode included in each of the metal-air batteries. For example, the bipolar plate may include porous stainless steel or porous ceramic.

The battery module may be specifically used as a power source for an electric vehicle, a hybrid electric vehicle, a plug-in hybrid electric vehicle, or a power storage device.

The present specification provides an electrode structure including a solid electrolyte membrane and an electrode manufactured by the manufacturing method on the solid electrolyte membrane.

The electrode of the electrode structure may be an air electrode.

While the electrode is manufactured by the method for manufacturing an electrode according to the present specification on the solid electrolyte membrane, the solid electrolyte membrane and the electrode may be entangled with each other on the interface therebetween. In this case, there is an advantage in that the interface resistance greatly affecting the performance of the cell is excellent.

The electrode structure may have an area specific resistance of 1 $\Omega cm^2$ or less at 650° C. Specifically, the electrode structure may have an area specific resistance of less than 0.44 $\Omega cm^2$ at 650° C. More specifically, the area specific resistance at the interface between the solid electrolyte membrane and the electrode may be less than 0.44 $\Omega cm^2$. When the electrode is an air electrode, the area specific resistance at the interface between the solid electrolyte membrane and the air electrode may be less than 0.44 $\Omega cm^2$.

The lower limit of the area specific resistance of the electrode structure at 650° C. is particularly limited because the smaller lower limit is preferred, but the electrode structure may have an area specific resistance of more than 0 $\Omega cm^2$ and less than 0.44 $\Omega cm^2$ at 650° C.

The present specification provides a composition for manufacturing an electrode, the composition including a precursor of a composite metal oxide.

The composition for manufacturing an electrode may include a precursor of a composite metal oxide.

The precursor of the composite metal oxide refers to a material in a step before the precursor becomes a composite metal oxide particle to be prepared. Specifically, the precursor of the composite metal oxide may include at least one among two or more metal oxides including one or two or more metals among metals constituting the composite metal oxide to be prepared, and one or two or more metals among metals constituting the composite metal oxide to be prepared.

In an exemplary embodiment of the present specification, the type of precursor of the composite metal oxide is not particularly limited as long as the precursor includes at least one among two or more metal oxides including one or two or more metals among metals constituting the composite metal oxide to be prepared, and one or two or more metals among metals constituting the composite metal oxide to be prepared.

When the composite metal oxide to be prepared is a perovskite-type particle, the precursor of the composite metal oxide may be a precursor of a perovskite-type particle.

The precursor of the composite metal oxide may include one or more first precursors including a first metal disposed at the A position and one or more second precursors including a second metal disposed at the B position in an $ABO_{3-\delta}$ structure of the perovskite-type particle. Specifically, the precursor of the composite metal oxide may include: a first precursor including one to three first metals selected among lanthanum (La), strontium (St), gadolinium (Gd), samarium (Sm), barium (Ba), and bismuth (Bi); and a second precursor including one to three second metals selected among manganese (Mn), cobalt (Co), iron (Fe), nickel (Ni), and calcium (Ca).

The precursor of the composite metal oxide may include at least one of metal oxides, metal carbonates, metal nitrates, metal sulfates, metal chlorides, and metal hydroxides. The precursor of the composite metal oxide may include a first precursor including at least one of an oxide of the first metal, a carbonate of the first metal, a nitrate of the first metal, a sulfate of the first metal, a chloride of the first metal, and a hydroxide of the first metal; and a second precursor including at least one of an oxide of the second metal, a carbonate of the second metal, a nitrate of the second metal, a sulfate of the second metal, a chloride of the second metal, and a hydroxide of the second metal. Specifically, the first precursor may include at least one of a lanthanum-containing material which is lanthanum oxide, lanthanum nitrate hydrate, lanthanum sulfate, lanthanum chloride or lanthanum hydroxide; a strontium-containing material which is strontium oxide, strontium carbonate, strontium nitrate hydrate, strontium sulfate, strontium chloride or strontium hydroxide; a manganese-containing material which is manganese oxide, manganese carbonate, manganese nitrate hydrate, manganese sulfate, manganese chloride or manganese hydroxide; a gadolinium-containing material which is gadolinium oxide, gadolinium carbonate, gadolinium nitrate hydrate, gadolinium sulfate, gadolinium chloride or gadolinium hydroxide; a samarium-containing material which is samarium oxide, samarium carbonate, samarium nitrate hydrate, samarium sulfate, samarium chloride or samarium hydroxide; a barium-containing material which is barium oxide, barium carbonate, barium nitrate hydrate, barium sulfate, barium chloride or barium hydroxide; and a bismuth-containing material which is bismuth oxide, bismuth carbonate, bismuth nitrate hydrate, bismuth sulfate, bismuth chloride or bismuth hydroxide, and the second precursor may include at least one of a cobalt-containing material which is cobalt oxide, cobalt carbonate, cobalt nitrate hydrate, cobalt sulfate, cobalt chloride or Cobalt hydroxide; an iron-containing material which is ferrite oxide, ferrite carbonate, ferrite nitrate hydrate, ferrite sulfate, ferrite chloride or Ferrite hydroxide; a nickel-containing material which is nickel oxide, nickel carbonate, nickel nitrate hydrate, nickel sulfate, nickel chloride or nickel hydroxide; or a calcium-containing material which is calcium oxide, calcium carbonate, calcium nitrate hydrate, calcium sulfate, calcium chloride or calcium hydroxide.

A molar ratio of the first metal to the second metal may be theoretically 1:1, but may be 0.9 to 1.1:0.9 to 1.1 in consideration of the error range.

For example, when the composite metal oxide to be prepared is $La_{0.6}Sr_{0.4}Co_{0.2}Fe_{0.8}O_{3-\delta}$, the precursor of the composite metal oxide particle may include lanthanum (La); strontium (Sr); cobalt (Co); and at least one iron-containing material of Fe oxide, Fe nitrate, and Fe sulfate. Here, when a portion of a trivalent metal (La and the like) is substituted with a divalent metal (Sr and the like) in a perovskite structure having a standard composition of $ABO_3$ (A and B are a trivalent metal), an oxygen vacancy occurs in order to adjust the charges to a neutral state, and as a result, among the oxygens in the particle, an oxygen having a smaller valence than 3 is present, and the oxygen is represented by "$O_{3-\delta}$".

Based on the total weight of the composition for manufacturing an electrode, the content of the precursor of the composite metal oxide may be 20 wt % or more and 60 wt % or less. In this case, there may be an advantage in that the composition for manufacturing an electrode may be uniformly formed, and the handling for manufacturing an electrode is facilitated.

The composition for manufacturing an electrode may further include a binder resin.

The type of binder resin is not particularly limited, and a typical material known in the art may be used, but for example, the binder resin may be at least one of an acrylic polymer, polyvinylidene fluoride (PVDF), polyvinyl alcohol, carboxymethyl cellulose (CMC), starch, hydroxypropyl cellulose, regenerated cellulose, ethyl cellulose, polyvinylpyrrolidone, tetrafluoroethylene, polyethylene, polypropylene, an ethylene-propylene-diene polymer (EPDM), a sulfonated-EPDM, a styrene-butadiene rubber, a fluorine rubber, and a copolymer thereof.

Based on the total weight of the composition for manufacturing an electrode, the content of the binder resin may be 20 wt % or more and 60 wt % or less.

The composition for manufacturing an electrode may further include at least one of a solvent, a dispersant, and a plasticizer.

The solvent is not largely limited as long as the solvent is a material which disperses a precursor of a composite metal oxide and is easily removed after an electrode composition is applied, and a typical material known in the art may be used. For example, the solvent may include at least one selected from water, isopropanol, toluene, ethanol, n-propanol, n-butyl acetate, methyl ethyl ketone (MEK), ethylene glycol, butyl carbitol (BC), propyl glycol monomethyl ether acetate (PGMEA), and butyl carbitol acetate (BCA).

Based on the total weight of the composition for manufacturing an electrode, the content of the solvent may be 1 wt % or more and 30 wt % or less.

The dispersant and the plasticizer are not particularly limited, and typical materials known in the art may be used.

The dispersant may be at least one of BYK-110 and BYK-111.

Based on the total weight of the composition for manufacturing an electrode, the content of the dispersant may be 5 wt % or more and 15 wt % or less.

The plasticizer may be at least one of di-butyl-phthalate (DBP), di-2-ethylhexyl phthalate (DOP), di-isononyl phthalate (DINP), di-isodecyl phthalate (DIDP), and butyl benzyl phthalate (BBP), which are commercially available products.

Based on the total weight of the composition for manufacturing an electrode, the content of the plasticizer may be 0.1 wt % or more and 1 wt % or less.

MODE FOR INVENTION

Hereinafter, the present specification will be described in more detail through Examples. However, the following Examples are provided only for exemplifying the present specification, but are not intended to limit the present specification.

EXAMPLES

Example 1

For the preparation of an electrode material, 0.3 mol of lanthanum oxide ($La_2O_3$), 0.4 mol of strontium carbonate ($SrCO_3$), 0.0667 mol of cobalt oxide ($Co_3O_4$), and 0.4 mol of iron oxide ($Fe_2O_3$) were weighed, and then a precursor of each of the composite metal oxides was uniformly mixed by using a ball mill.

An air electrode composition was prepared by adding ESL441 as a binder resin thereto. Based on the total weight of the air electrode composition, the content of the precursor of the composite metal oxide was 60 wt %, and the content of the binder resin was 40 wt %. The composition was used as an air electrode composition paste in the Example by using a 3-roll mill.

GDC (Gd 10% doped Ce oxide) manufactured by Rhodia Inc. was used as an electrolyte support (thickness: 1,000 μm), the air electrode composition was applied onto both surfaces of the electrolyte support by a screen printing method and dried, and then an air electrode was formed by carrying out a heat treatment at 1,000° C. for 2 hours.

Comparative Example 1

For the preparation of an electrode material, 0.3 mol of lanthanum oxide ($La_2O_3$), 0.4 mol of strontium carbonate ($SrCO_3$), 0.0667 mol of cobalt oxide ($Co_3O_4$), and 0.4 mol of iron oxide ($Fe_2O_3$) were weighed, and then were uniformly mixed by using a ball mill. The resulting mixture was placed into an alumina crucible, the crucible was put into a furnace under the air atmosphere, the temperature was increased at 5° C. per minute, a heat treatment was carried out at 1,200° C. for 2 hours, and then the temperature was decreased at 5° C. per minute, thereby manufacturing a lanthanum strontium cobalt ferrite particle being a composite metal oxide.

An air electrode composition was prepared by adding ESL441 as a binder thereto. Based on the total weight of the air electrode composition, the content of the composite metal oxide was 60 wt %, and the content of the binder was 40 wt %. The composition was used as an air electrode composition paste by using a 3-roll mill.

GDC (Gd 10% doped Ce oxide) manufactured by Rhodia Inc. was used as an electrolyte support (thickness: 1,000 μm), the air electrode composition was applied onto both surfaces of the electrolyte support by a screen printing method and dried, and then an air electrode was formed by carrying out a heat treatment at 1,000° C. for 12 hours.

Experimental Example 1

Scanning Electron Microscopy Measurement

The cross sections in a thickness direction in Example 1 and Comparative Example 1 were measured, and are illustrated in FIGS. 2 and 3, respectively.

Experimental Example 2

For the measurement of the area specific resistance (ASR), a platinum (Pt) wire was joined to each of the manufactured air electrodes, and then the area specific resistances at 650° C. were measured by using a 4 probe 2 wire method. In this case, as a measurement apparatus used, Solartron 1287 and Solartron 1260 were used. The results of measuring the area specific resistances in Example 1 and Comparative Example 1 are illustrated in FIGS. 2 and 3, respectively.

The invention claimed is:

1. A method for manufacturing a battery or a fuel cell electrode, the method comprising:

forming a film by applying a composition comprising a precursor of a composite metal oxide onto a base material, wherein the precursor of the composite metal oxide comprises:

a first precursor comprising one to three first metals selected among lanthanum (La), strontium (St), gadolinium (Gd), samarium (Sm), barium (Ba), and bismuth (Bi); and a second precursor comprising one to three second metals selected among manganese (Mn), cobalt (CO), iron (Fe), nicel (Ni), and calcium (Ca);

wherein the base material is an electrolyte membrane; and manufacturing an electrode by firing the film, wherein in the firing, the film is sintered while the precursor of the composite metal oxide undergoes a chemical transformation to form a composite metal oxide.

2. The method of claim 1, wherein the synthesized composite metal oxide comprises at least one of lanthanum strontium manganese oxide (LSM), lanthanum strontium cobalt ferrite (LSCF), lanthanum strontium gallium magnesium oxide (LSGM), lanthanum strontium nickel ferrite (LSNF), lanthanum calcium nickel ferrite (LCNF), lanthanum strontium copper oxide (LSC), gadolinium strontium cobalt oxide (GSC), lanthanum strontium ferrite (LSF), samarium strontium cobalt oxide (SSC), barium strontium cobalt ferrite (BSCF), bismuth strontium ferrite oxide (BiSF), and bismuth strontium cobalt oxide (BiSC).

3. The method of claim 1, wherein in the firing, a firing temperature is 900° C. or more and 1,200° C. or less.

4. The method of claim 1, wherein in the firing, a firing time is 1 hour or more and 5 hours or less.

5. A battery or a fuel cell electrode manufactured by the method according to claim 1.

6. The battery or the fuel cell electrode of claim 5, wherein the electrode is an air electrode.

7. A fuel cell comprising:

the electrode according to claim 5;

a fuel electrode; and an electrolyte membrane provided between the electrode and the fuel electrode.

8. The fuel cell of claim 7, wherein the electrolyte membrane is a solid electrolyte membrane or a polymer electrolyte membrane.

9. A battery module comprising the fuel cell of claim 7 as a unit cell.

10. A metal-air secondary battery comprising:

a battery electrode;

an anode; and a separation membrane provided between the electrode and the anode, wherein the battery electrode is manufactured according to a method comprising:

forming a film by applying a composition comprising a precursor of a composite metal oxide onto a base material, wherein the base material is an electrolyte membrane; and manufacturing an electrode by firing the film, wherein in the firing, the film is sintered while the precursor of the composite metal oxide undergoes a chemical transformation to form a composite metal oxide.

11. A battery module comprising the metal-air secondary battery of claim 10 as a unit cell.

12. An electrode structure comprising:

a solid electrolyte membrane; and a battery or a fuel cell electrode manufactured by the method according to claim 1 on the solid electrolyte membrane.

13. The electrode structure of claim 12, wherein the solid electrolyte membrane and the electrode are entangled with each other at an interface therebetween.

14. The electrode structure of claim 12, wherein the electrode structure has an area specific resistance of less than 0.44 $\Omega cm^2$ at 650° C.

15. A composition for manufacturing an electrode, the composition comprising a precursor of a composite metal oxide, wherein the precursor of the composite metal oxide comprises:

a first precursor comprising one to three first metals selected among lanthanum (La), strontium (St), gadolinium (Gd), samarium (Sm), barium (Ba), and bismuth (Bi); and a second precursor comprising one to three second metals selected among manganese (Mn), cobalt (Co), iron (Fe), nickel (Ni), and calcium (Ca).

16. The composition of claim 15, wherein a molar ratio of the first metal to the second metal is 0.9 to 1.1:0.9 to 1.1.

17. The composition of claim 15, further comprising: a binder resin; and a solvent.

18. The composition of claim 17, wherein based on a total weight of the composition for manufacturing an electrode, a content of the composite metal oxide precursor is 20 wt % or more and 60 wt % or less, a content of the binder resin is 20 wt % or more and 60 wt % or less, and a content of the solvent is 1 wt % or more and 30 wt % or less.

* * * * *